United States Patent
Burmeister et al.

(10) Patent No.: US 6,780,271 B1
(45) Date of Patent: *Aug. 24, 2004

(54) METHOD FOR CONTINUOUS, SOLVENT AND MASTICATION-FREE PRODUCTION OF PRESSURE-SENSITIVE SELF-ADHESIVE MATERIALS BASED ON NON-THERMOPLASTIC ELASTOMERS AND THEIR COATING FOR THE PRODUCTION OF SELF-ADHESIVE ARTICLES

(75) Inventors: Axel Burmeister, Hamburg (DE); Sven Hansen, Hannover (DE); Frank Henke, Neu Wulmstorf (DE); Ralf Hirsch, Quickborn (DE); Heiko Leydecker, Norderstedt (DE); Klaus Massow, Hamburg (DE); Jochen Stähr, Hannover (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/582,069
(22) PCT Filed: Feb. 13, 1999
(86) PCT No.: PCT/EP99/00968
  § 371 (c)(1),
  (2), (4) Date: Jun. 21, 2000
(87) PCT Pub. No.: WO99/42276
  PCT Pub. Date: Aug. 26, 1999

(30) Foreign Application Priority Data

Feb. 18, 1998 (DE) .......................... 198 06 609

(51) Int. Cl.$^7$ ............................................... B29C 47/00
(52) U.S. Cl. .............................. 156/244.11; 156/244.27; 156/338; 264/176.1; 264/211; 264/211.23
(58) Field of Search ........................... 425/94, 97, 101; 427/208.4, 294, 516; 428/492; 156/244.11, 244.27, 244.23, 244.24, 326, 331.7, 338; 264/176.1, 211, 211.12, 211.21, 211.23, 211.24, 216

(56) References Cited

U.S. PATENT DOCUMENTS 2,879,547 A * 3/1959 Morris .................... 156/243

(List continued on next page.)

FOREIGN PATENT DOCUMENTS

DE  23 03 366 A  7/1974
DE  25 21 774 A  11/1976

(List continued on next page.)

OTHER PUBLICATIONS

Derwent Abstract ACC–NO 1997–260140, DE 9421955 U1.*

(List continued on next page.)

*Primary Examiner*—Michael W. Ball
*Assistant Examiner*—Gladys Corcoran
(74) *Attorney, Agent, or Firm*—Norris McLaughlin & Marcus (57) ABSTRACT

Process for the continuous solvent-free and mastication-free production of self-adhesive compositions based on non-thermoplastic elastomers in a continuously operating apparatus having a filling section and a compounding section, comprising
  a) feeding the solid components of the self-adhesive composition, such as elastomers and resins, into the filling section of the apparatus, optionally feeding of fillers, colorants and/or crosslinkers,
  b) transferring the solid components of the self-adhesive composition from the filling section to the compounding section,
  c) adding the liquid components of the self-adhesive composition, such as plasticizers, crosslinkers and/or further tackifier resins to the compounding section,
  d) preparing a homogeneous self-adhesive composition in the compounding section, and
  e) discharging the self-adhesive composition.

22 Claims, 2 Drawing Sheets

U.S. PATENT DOCUMENTS

| | | | | |
|---|---|---|---|---|
| 3,634,381 A | * | 1/1972 | Lehnerer et al. | 425/202 |
| 4,192,617 A | * | 3/1980 | Spielhoff | 366/301 |
| 4,614,778 A | * | 9/1986 | Kajiura et al. | 526/169.2 |
| 5,274,036 A | * | 12/1993 | Korpman et al. | 525/92 K |
| 5,539,033 A | | 7/1996 | Bredahl et al. | |
| 5,550,175 A | | 8/1996 | Bredahl et al. | |
| 5,798,175 A | * | 8/1998 | Tynan et al. | 428/355 BL |

FOREIGN PATENT DOCUMENTS

| | | | |
|---|---|---|---|
| DE | 31 33 647 A | 3/1983 | |
| DE | 39 08 415 A1 | 9/1990 | |
| DE | 44 33 487 A1 | 3/1996 | |
| DE | 195 18 255 A1 | 11/1996 | |
| DE | 196 34 813 A1 | 3/1997 | |
| DE | 9421955 U1 * | 5/1997 | B29C/47/42 |
| DE | 94 21 955 U1 | 6/1997 | |
| DE | 196 31 182 A1 | 7/1997 | |
| EP | 0 818 521 A | 1/1998 | |
| EP | 0 874 034 A | 10/1998 | |
| GB | 2 274 429 A | 7/1994 | |
| WO | WO 94/11175 | 10/1993 | |
| WO | WO 95/25774 | 2/1995 | |
| WO | WO 97/07963 | 7/1996 | |

OTHER PUBLICATIONS

Patent Abstracts of Japan vol. 098, No. 014, Dec. 31, 1998 & JP 10 259359 A (OJI Paper Co., Ltd.), Sep. 29, 1998.
CIPO—Canadian Patent Database—Details—698518.
Derwent Abstract JP 07324182 A.
Derwent Abstract JP 07278509 A.
Derwent Abstract JP 07331197 A.

* cited by examiner

METHOD FOR CONTINUOUS, SOLVENT AND MASTICATION-FREE PRODUCTION OF PRESSURE-SENSITIVE SELF-ADHESIVE MATERIALS BASED ON NON-THERMOPLASTIC ELASTOMERS AND THEIR COATING FOR THE PRODUCTION OF SELF-ADHESIVE ARTICLES

The present invention relates to a process for the continuous, solvent- and mastication-free production of pressure-sensitive self-adhesive compositions based on non-thermoplastic elastomers, using tackifier resins, typical rubber plasticizers, optionally fillers and heat-activatable crosslinkers, and to the coating thereof to produce self-adhesive articles, in particular high-performance self-adhesive tapes.

BACKGROUND OF THE INVENTION

Fundamental to the profile of performance requirements of pressure-sensitive adhesive systems and the pressure-sensitive adhesive articles produced with them are the two physical phenomena of adhesion and cohesion. Adhesion is dealt with in the technical jargon using the terms instant bond strength (tack) and bond strength (peel strength) and describes by definition the terms "self-adhesive" and/or "pressure-sensitive adhesive", i.e. permanent adhesive bonding under "gentle pressure".

Especially in the case of pressure-sensitive adhesives based on natural rubber, this property is obtained by mixing in tackifier resins (tackifiers) and plasticizers having relatively low molecular weights.

The second defining property of the pressure-sensitive adhesives is their simple residue-free redetachability after use. This property is determined essentially by the high molecular mass rubber fractions as the elastomer component, which give the system, in the form of cohesion (internal strength), the required strength under shear stress, which is of particular significance for the use of the products at relatively high temperatures and/or mechanical loads. By additional crosslinking, for example by way of ionizing rays, reactive resin components or other chemical crosslinkers, this property can be reinforced.

The performance of the pressure-sensitive adhesive is, therefore, critically determined by the balanced proportion of adhesion properties and cohesion properties and by compatibility, homogeneity and stability of the blend of components with extremely high and relatively low average molecular weights, something which is relatively easy to achieve in the case of production of the composition in industry-standard mixers and kneading machines using solvents.

The solvent-free compounding and processing of self-adhesive compositions, on the other hand, has become established primarily only for the processing of elastomers which melt, so-called thermoplastic elastomers.

In this case, the process of producing the composition is normally conducted in the melt in twin-screw extruders at relatively high temperatures, with coating taking place normally by means of slot dies.

The advantage of using thermoplastic elastomers lies essentially in a simplification of the coating process. The avoidance of flammable solvents does away with the need for the drier units, with their high energy consumption for the evaporation and recovery of the solvents, and to use explosion-protected units. Hot-melt coating units are compact and permit much higher coating speeds. Moreover, the technology is an environment-friendly one in which there are no solvent emissions.

For the solvent-free compounding of thermoplastic elastomers, the prior art makes use predominantly of block copolymers having polystyrene block fractions. The advantage of this class of substance is that the polystyrene domains present in the polymer soften above 100° C., accompanied by a sharp fall in the viscosity of the adhesive composition and thereby providing ease of processing. After cooling to room temperature, the polystyrene domains are reformed and impart a certain shear strength to the pressure-sensitive adhesives based on thermoplastic elastomers.

The thermoplastic elastomers can be compounded faultlessly in the extruder process using hydrocarbon resins which promote bond strength. In this way, a desired level of bond strength can be achieved with relative ease. The resultant pressure-sensitive adhesives, however, remain sensitive to temperatures above 40° C. For the self-adhesive tapes produced on this basis, this remanent "creep behaviour" is critical for unrestricted storage stability (blocking of the rolls in the stack, especially in the course of transportation in relatively warm climate zones) and for their use at relatively high operating temperatures (for example as masking tapes in automotive finishing, where despite post-crosslinking such tapes lose their functional capacity: the pressure-sensitive adhesive softens and the shear strength for fixing the masking papers is no longer ensured).

For this reason, the known hot-melt pressure-sensitive adhesives based on block copolymers have been able to establish themselves almost exclusively for packaging tapes and for labels for use at room temperatures.

Using non-thermoplastic elastomers, such as natural rubber, on the other hand, it is possible to achieve the required shear strengths; however, the solvent-free production and processing of natural-rubber pressure-sensitive adhesives has to date confronted the person skilled in the art with unsolved problems.

Owing to the extremely high molecular mass fractions of the rubber (with $M_w \geq 1$ million), solvent-free self-adhesive compositions cannot be processed by the hot-melt pressure-sensitive adhesive technology, or else the rubbers used must be reduced in their molecular weight (broken down) so greatly before processing that as a result of this breakdown their suitability for high-performance self-adhesive compositions is impaired.

The deliberate industrial process of rubber breakdown under the combined action of shear stress, temperature and atmospheric oxygen is referred to in the technical literature as mastication and is generally carried out in the presence of chemical auxiliaries, which are known from the technical literature as masticating agents or peptizers, or, more rarely, as "chemical plasticizing aids". In rubber technology, the mastication step is necessary in order to make it easier to integrate the additives.

This mastication must be clearly distinguished from the breakdown known as degradation which results in all of the standard solvent-free polymer technologies, such as compounding, conveying and coating in the melt. Uncontrolled degradation often constitutes an unwanted phenomenon. It can be minimized by providing an inert gas atmosphere.

A variety of routes to the solvent-free production and processing of rubber pressure-sensitive adhesives have been described.

The patent CA 698 518 describes a process for achieving production of a composition by adding high proportions of plasticizer and/or simultaneously strong mastication of the rubber. Although this process can be used to obtain pressure-sensitive adhesives having an extremely high tack, user-compatible shear strength, even with a relatively high level of subsequent crosslinking, can be achieved only to a limited extent owing to the relatively high plasticizer content or else to the severe breakdown in molecular structure of the elastomer to a molecular weight average of $M_w \leq 1$ million.

The use of polymer blends, where besides non-thermoplastic natural rubber use is also made of block copolymers, in a ratio of approximately 1:1, is essentially an unsatisfactory compromise solution, since it results neither in high shear strengths when the self-adhesive tapes are used at relatively high temperatures nor in significant improvements relative to the properties described in the patent.

JP 07 324 182 A2 describes a multistage process in which a double-sided adhesive tape has a pressure-sensitive adhesive layer based on an acrylic resin adhesive and has a second layer comprising a blend of isoprene-styrene elastomer, natural rubber and non-reactive hydrocarbon resin (Arkon P 100). This tape is used as a carpet-laying tape, where there are likewise no stringent requirements on the shear strength at elevated temperatures.

The use of non-thermoplastic elastomers is also described in JP 95 331 197, where use is made of an isocyanate-reactive natural rubber (polyisoprene grafted with maleic ester) having an average molecular weight of below 1 million with aliphatic non-reactive hydrocarbon resins, which is crosslinked with blocked isocyanates (for example Desmodur CT); the mixture is initially crosslinked at 150° C. for five minutes and following its subsequent coating onto PET film is cured at 180° C. for several minutes (for example 15 minutes). This procedure clearly shows how complicated it is to achieve postcrosslinking if the natural rubber is subjected to excessive breakdown during the production process.

The patent application JP 95 278 509 protects a self-adhesive tape in which the natural rubber is masticated to an average molecular weight of $M_w$=100,000 to 500,000 in order to obtain a coatable homogeneous mixture comprising hydrocarbon resins, rosin/rosin-derivative resins and terpene resins, which can be processed readily at between 140° C. and 200° C. with a coating viscosity of from 10 to 50×10$^3$ cps but require an extremely high subsequent EBC dose (40 Mrad) in order to ensure the shear strength necessary for their use. For carrier materials such as impregnated and/or sized papers, and for woven carriers based on viscose staple and the like, the system is not very suitable, since at the necessarily high beam doses there is significant carrier deterioration.

The use of exclusively non-thermoplastic rubbers as the elastomer component in the formulation of pressure-sensitive adhesives with the existing cost advantage possessed by, for example, natural rubbers over the standard commercial block copolymers, and the outstanding properties, especially the shear strength of natural rubber and of corresponding synthetic rubbers, is also set out at length in the patents WO 94 11 175, WO 95 25 774, WO 97 07 963 and, correspondingly, U.S. Pat. Nos. 5,539,033 and 5,550,175. In these cases, the additives customary in pressure-sensitive adhesive technology, such as tackifier resins, plasticizers and fillers, are described.

The production process disclosed in each case is based on a twin-screw extruder which permits compounding to a homogeneous pressure-sensitive adhesive blend with the chosen process regime, involving mastication of the rubber and subsequent gradual addition of the individual additives with an appropriate temperature regime.

The mastication step of the rubber, which precedes the actual production process, is described at length. It is necessary and characteristic of the process chosen, since with the technology chosen therein it is indispensable to the subsequent integration of the other components and to the extrudability of the blended composition. Also described is the feeding in of atmospheric oxygen, as recommended by R. Brzoskowski, J. L. and B. Kalvani in Kunststoffe 80 (8), (1990), p. 922 ff., in order to accelerate mastication of the rubber.

This procedure makes it absolutely necessary to practise the subsequent step of electron beam crosslinking (EBC) and to use reactive substances as EBC promoters in order to achieve an effective crosslinking yield.

Both process steps are described in the abovementioned patents, but the EBC promoters chosen also tend towards unwanted chemical crosslinking reactions at elevated temperatures, which limits the use of certain tackifier resins.

Owing to the unavoidable high product temperatures, compounding in a twin-screw extruder prevents the use of heat-activatable substances suitable for crosslinking the adhesive compositions, such as, for example, reactive (optionally halogenated) phenolic resins, sulphur or sulphur-donor crosslinker systems, since the chemical crosslinking reactions which ensue in the process result in such a great increase in viscosity that the coatability of the resulting pressure-sensitive adhesive composition is impaired.

In summary, it can be stated that all of the known processes are characterized by extremely severe rubber breakdown. When the compositions are processed further into self-adhesive tapes, this necessitates extreme crosslinking conditions and results, moreover, in a partially restricted applications profile, especially as regards the use of resultant self-adhesive tapes at elevated temperatures.

There is numerous known apparatus for the continuous production and processing of solvent-free polymer systems. In common use are screw machines such as single-screw and twin-screw extruders in a variety of process lengths and with a variety of fittings. However, continuously operating kneading apparatus of a very wide variety of constructions, including, for example, combinations of kneading and screw machines, or else planetary roll extruders, are also used for this purpose.

Planetary roll extruders have been known for a fairly long time and were first used in the processing of thermoplastics such as PVC, for example, where they were used primarily to supply the downstream units such as, for example, calenders or roll mills. As a consequence of their advantage of the great renewal of surface area for material exchange and heat exchange, by means of which the frictional energy can be dissipated rapidly and effectively, and because of the low residence time and the narrow residence-time spectrum, their use in recent times has been extended, inter alia, to compounding processes which require a particular temperature-controlled regime.

Depending on manufacturer, planetary roll extruders are available in various designs and sizes. The diameters of the roll cylinders, depending on the desired throughput, are typically between 70 mm and 400 mm.

Planetary roll extruders generally have a filling section and a compounding section. The filling section consists of a conveying screw to which all of the solid components are fed continuously. The conveying screw then passes the material to the compounding section. The area of the filling section, together with the screw, is preferably cooled in order to prevent baking-on of materials on the screw. Alternatively, there are designs without a screw section, where the material is fed directly between central spindles and planetary spindles. However, this is not important for the effectiveness of the process of the invention.

The compounding section consists of a driven central spindle and a number of planetary spindles which rotate around the central spindle within a roll cylinder with internal helical gearing. The rotary speed of the central spindle and hence the rotational speed of the planetary spindles can be varied and is therefore an importance parameter for the control of the compounding process. The materials are circulated between the central and planetary spindles, or between the planetary spindles and the helical gearing of the roll section, so that under the influence of shear energy and external heating the materials are dispersed to form a homogeneous compound.

The number of planetary spindles rotating in each roll cylinder can be varied and thus adapted to the requirements of the process. The number of spindles influences the free volume within the planetary roll extruder, and the residence time of the material in the process, and also determines the surface area for heat and material exchange. By way of the shear energy introduced, the number of planetary spindles has an influence on the result of compounding. Given a constant diameter of roll cylinder, a larger number of spindles permits better homogenization and dispersion or, respectively, a greater product throughput.

The maximum number of planetary spindles installable between the central spindle and the roll cylinder depends on the diameter of the roll cylinder and on the diameter of the planetary spindles used. When using relatively large roll diameters, as required for obtaining production-scale throughputs, and/or relatively small diameters for the planetary spindles, the roll cylinders can be equipped with a relatively large number of planetary spindles. With a roll diameter of D=70 mm, typically up to seven planetary spindles are used, whereas with a roll diameter of D=200 mm ten, for example, and with a roll diameter of D=400 mm 24 for example, planetary spindles can be used.

In this context, reference is made to the patent applications and, respectively, utility model DE 196 31 182, DE 94 21 955, DE 195 34 813, DE 195 18 255 and DE 44 33 487, which give an overview of the prior art in the field of planetary roll extruders.

Thus, furthermore, DE 39 08 415 A1 describes the processing of rubber mixtures or rubberlike mixtures by means of planetary roll extruders. For the purpose of further processing on downstream equipment, pre-batches or finished mixtures are masticated and plastified on a planetary roll extruder. Likewise described is the production of finished mixtures in a planetary roll extruder: in this case vulcanizing systems and other components are metered into the rubber premixes.

The object of the present invention was to provide a process with which pressure-sensitive self-adhesive compositions based on non-thermoplastic elastomers can be produced continuously without solvent, with or without the use of thermally reactive components, and, if desired, can be coated in-line without the need for property-impairing mastication of the rubber.

SUMMARY OF THE INVENTION

The invention accordingly provides a process for the continuous solvent-free and mastication-free production of self-adhesive compositions based on non-thermoplastic elastomers in a continuously operating apparatus having a filling section and a compounding section, comprising the following steps:

a) feeding the solid components of the self-adhesive composition, such as elastomers and resins, into the filling section of the apparatus, optionally feeding of fillers, colorants and/or crosslinkers, b) transferring the solid components of the self-adhesive composition from the filling section to the compounding section, c) adding the liquid components of the self-adhesive composition, such as plasticizers, crosslinkers and/or further tackifier resins, optionally in the melted state, to the compounding section, d) preparing a homogeneous self-adhesive composition in the compounding section, and e) discharging the self-adhesive composition.

It has been found particularly advantageous to use, as the continuously operating apparatus, a planetary roll extruder whose compounding section consists preferably of at least two, but with particular preference three, coupled roll cylinders, it being possible for each roll cylinder to have one or more separate temperature control circuits.

DETAILED DESCRIPTION OF THE INVENTION

Unlike otherwise conventional production processes, in the planetary roll extruder in accordance with the process of the present invention, in particular, there is no property-impairing mastication of the non-thermoplastic elastomers, since in this case they are not subjected separately to the effect of high shear energy but instead are always processed together with one or more liquid components. These liquid components can include both plasticizers such as oils, for example, and also resins which only melt during the compounding process under the action of shear energy and/or external heating. The presence of these liquid components limits the extent of frictional energy such that it is possible to avoid the mastication of the rubber, i.e. the molecular weight breakdown of the elastomers, and high resultant compounding temperatures.

Furthermore, planetary roll extruders have extremely large areas where material exchange and surface renewal take place, by which means it is possible to dissipate rapidly the frictional shear energy and thus to avoid undesirably high product temperatures.

The filling section of the roll cylinder consists of a conveying screw to which all of the solid components are fed continuously. The conveying screw then passes the material to the compounding section. The area of the filling section, together with the screw, is preferably cooled in order to prevent baking-on of materials on the screw. Alternatively, there are designs without a screw section, where the material is fed directly between central spindles and planetary spindles. However, this is not important for the effectiveness of the process of the invention.

As already stated, the number of planetary spindles has an effect on the compounding result by way of the shear energy introduced: given a constant roll cylinder diameter, a larger number of spindles can be used to achieve better homogenization and dispersion or a greater product throughput. In accordance with the present invention, preferably at least half, with particular preference at least ¾, of the possible number of planetary spindles are to be used in order to obtain a good ratio of compounding quality to product rate.

For the process of the invention it is advantageous to use a planetary roll extruder whose compounding section has been extended by coupling at least two roll cylinders. Firstly, despite the presence of friction-reducing components for the purpose of avoiding mastication of the rubber, the complete digestion of the elastomer components, and the desired homogenization and dispersion at economic throughput rates, is possible by this means; secondly, the coupling of, preferably, separately temperature-controlled roll cylinders permits a balanced temperature regime of the process, so allowing the use of heat-activatable crosslinker systems.

Whereas in the front compounding section of the planetary roll extruder the roll cylinders are advantageously heated at temperatures above the melting point of the resins used, the rear compounding section is advantageously cooled in order to reduce the product temperature. By this means, the residence time of the self-adhesive composition at relatively high temperatures is kept as low as possible, thereby preventing the activation of the thermal crosslinker systems present in the self-adhesive composition.

Of course, any roll cylinder can be equipped differently in terms of the number and nature of the planetary spindles and so can be adapted to the particular formulation and processing requirements. Between two coupled roll cylinders there is generally an approach ring through whose free cross section the central spindle is guided and which holds the planetary spindles of a roll cylinder in fixed location. Approach rings can have various free cross sections, thereby allowing the holdup of the product, and thus the filling level and/or extent of shear energy, to be varied and to be adapted to the requirements of the process. In addition, the approach rings can be provided with radial bores through which fluids such as, for example, plasticizer oils or else inert gases such as nitrogen, argon, carbon dioxide or the like can be supplied to the compounding section of the planetary roll extruder.

The central spindle, and each roll cylinder as well, should preferably have one or more separate temperature control or cooling circuits in order to allow a temperature regime which permits the use of heat-activatable crosslinking systems. In cases where this is unnecessary, the temperature control circuits of coupled roll cylinders can also be combined with one another in order to minimize the number of temperature control devices.

For the purposes of the invention, the filling section of the planetary roll extruder, and the central spindle, should be preferably not heated but instead cooled, in order to prevent baking-on of material on the filling screw and to ensure effective heat exchange with the adhesive composition.

In the process according to the present invention, all solid components, such as elastomers, fillers and adjuvants, resins, ageing inhibitors, etc., are metered together into the filling area of the planetary roll extruder. These substances can be added either as separate components in each case or else as a conjoint premix or else as partial premixes to the compounding apparatus. Metering in the components in the form of a premix is particularly appropriate if the components are in similar supply forms or have similar bulk densities, so that in this way the number of metering systems can be minimized. Premixes can be produced in a simple manner, for example, in powder mixers. Metering of the individual solid components takes place suitably by means of volumetric and gravimetric metering systems in customary designs. A further possibility is to add the fluid components, or only some of them, such as plasticizer oil, for example, to a premix.

The materials metered in are transported by the screw of the filling section into the first roll cylinder of the planetary roll extruder. Between each roll cylinder, fluid components such as, for example, plasticizer oils, soft resins or resin melts can be added via bores in the approach rings. The amount of liquid added prior to the influence of shear energy can be used to influence both the degree of breakdown of the elastomers and the compounding temperature of the pressure-sensitive adhesive composition. For example, a particularly low level of molecular weight breakdown of the elastomers is obtained if a liquid plasticizer is added at a point in time when there has still been no influence whatsoever of frictional energy, i.e. when this plasticizer is either added to a solids premix or the plasticizer oil is metered in continuously between the filling screw and the first roll cylinder. Also possible is the subdivision of the liquid components, in the form of a so-called split feed, over the barrel length, and this is another parameter for controlling the process in terms of elastomer breakdown and product temperature.

The process of the invention permits the production of high-performance self-adhesive compositions and, especially in conjunction with a downstream coating and crosslinking unit, permits the production of high-performance self-adhesive tapes accompanied by particular cost advantages.

The process consists essentially of the above process steps, which can be carried out optionally under an inert gas atmosphere in order to avoid oxidative polymer degradation.

In the first process step, a composition comprising the elastomers and the known adjuvants required for the production of self-adhesive compositions, such as fillers, ageing inhibitors, plasticizers and tackifier resins, is produced solvent-free in a planetary roll extruder, the composition having a final temperature of less than 150° C., preferably less than 130° C. and, with very particular preference, between 70° C. and 110° C. The overal residence time of the composition in the planetary roll extruder should not exceed three minutes. The resulting hot-melt adhesive composition has a viscosity of between 300 and 1500 Pa*s, in particular a viscosity of between 800 and 1200 Pa*s at 130° C. under a shear rate of 100 rad/s.

In the second process step, which takes place advantageously in conjunction with the compounding step in the planetary roll extruder, the pressure-sensitive hot-melt adhesive composition which is produced in accordance with the invention is coated solvent-free onto a carrier in web form, using an applicator unit.

Depending on the viscosity of the self-adhesive composition, various processes are suitable for coating the web-form materials. Self-adhesive compositions having viscosities of up to 5000 Pa*s under a shear rate of 1 rad/s, as are obtained, for example, using relatively high proportions of plasticizer oils or by adding thermoplastic elastomers to the non-thermoplastic elastomers, can be coated by means of an extrusion die downstream of the planetary roll extruder, the preferred extrusion die used being a coathanger manifold die. In order to obtain a defined, full-area application of composition on the web-form material, it is advantageous for the self-adhesive composition to be subjected to devolatilization before entering the coating die, this being particularly important in the case where inert gases are used during the compounding process in the planetary roll extruder.

In accordance with the process of the present invention, the devolatilization takes place under the action of reduced pressure, preferably in screw machines which are at the same time able to overcome the pressure drops of the pipelines and coating die. For this purpose, particular preference is given to single-screw extruders which in addition have a pressure regulation system, so that the coating of the web-form carrier materials can take place with amounts of applied composition with a very low range of fluctuation.

A further possibility for the coating of the web-form carrier materials with the self-adhesive composition produced by processes in accordance with the invention is to use roller coating applicator units or multi-roll coating calenders consisting of preferably three, with particular preference four, coating rolls, the self-adhesive composition being shaped to the desired thickness as it passes through one or more roll nips before transfer to the web-form material. This coating process is particularly preferable when the viscosities of the self-adhesive composition exceed levels of 5000 Pa*s under a shear rate of 1 rad/s, since in this case coating with extrusion dies no longer provides the necessary accuracy in terms of the amount of composition applied.

Depending on the nature of the web-form carrier material to be coated, coating can be carried out by the co-rotating or counter-rotating process.

Coating on roller coating applicator units or multi-roll coating calenders is possible at temperatures below 100° C., so that even self-adhesive compositions containing heat-activatable crosslinkers can be coated. For the purpose of increased freedom from gas bubbles in the coated adhesive composition, it is possible to install a vacuum devolatizer between the planetary roll extruder and the applicator unit; for example, a vacuum chamber, a devolatilizing extruder or the like.

Advantageously in conjunction with production of the composition and coating, in a third process step, the self-adhesive composition on the carrier is crosslinked by means of ionizing radiation, such as electron beams, for example, so that the resultant self-adhesive tape becomes shear-resistant and temperature-stable. UV rays as well can be used for crosslinking, in which case appropriate UV promoters must be added to the self-adhesive composition.

For further improved performance, or in the case of EBC-sensitive carriers, crosslinking can also be carried out by means of heat-activatable crosslinkers under the effect of temperature.

The heating of the pressure-sensitive hot-melt adhesive composition that is required for this purpose can be done with the aid of the known techniques, especially with the aid of high-temperature ducts, or else with the aid of infrared lamps, or by means of high-frequency magnetic alternating fields, examples being HF waves, UHF waves or microwaves.

Crosslinking of the pressure-sensitive hot-melt adhesive composition can be carried out, furthermore, by means of a combination of ionizing radiation and heat-activatable chemical crosslinkers.

The result is a highly shear-resistant pressure-sensitive self-adhesive composition whose properties are comparable with those of similar self-adhesive compositions produced in a solvent process.

With the process of the invention, virtually without exception, all known components, described in the literature, of rubber-based self-adhesive compositions can be processed without solvent.

Advantageously, the non-thermoplastic elastomer is chosen from the group of the natural rubbers or of the synthetic rubbers or consists of any desired blend of natural rubbers and/or synthetic rubbers, it being possible to choose the natural rubber or rubbers in principle from all available grades, such as, for example, crepe, RSS, ADS, TSR or CV grades, depending on the required purity and viscosity level, and it being possible to choose the synthetic rubber or rubbers from the group of the randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene vinyl acetate copolymers (EVA) and polyurethanes, and/or blends thereof.

With further preference, thermoplastic elastomers with a weight fraction of from 10 to 50% by weight, based on the overall elastomer content, can be added to the non-thermoplastic elastomers in order to improve their processability.

As representatives, mention may be made at this point in particular of the highly compatible styrene-isoprene-styrene (SIS) and styrene-butadiene-styrene (SBS) grades.

Tackifier resins which can be used are, without exception, all tackifier resins known to date and described in the literature. Representatives that may be mentioned include the rosins, their disproportionated, hydrogenated, polymerized and esterified derivatives and salts, the aliphatic and aromatic hydrocarbon resins, terpene resins and terpene-phenolic resins. Any desired combinations of these and other resins can be used in order to adjust the properties of the resultant adhesive composition in accordance with what is desired. Reference may be made expressly to the depiction of the state of knowledge in "Handbook of Pressure Sensitive Adhesive Technology" by Donatas Satas (van Nostrand, 1989).

Plasticizers which can be used are all plasticizing substances known from adhesive tape technology. They include, inter alia, the paraffinic and naphthenic oils, (functionalized) oligomers such as oligobutadienes and oligoisoprenes, liquid nitrile rubbers, liquid terpene resins, animal and vegetable oils and fats, phthalates, and functionalized acrylates.

For the purpose of heat-induced chemical crosslinking, it is possible in the process of the invention to use all known heat-activatable chemical crosslinkers, such as accelerated sulphur or sulphur donor systems, isocyanate systems, reactive melamine resins, formaldehyde resins and (optionally halogenated) phenol-formaldehyde resins and/or reactive phenolic resins or diisocyanate crosslinking systems with the corresponding activators, epoxidized polyester resins and acrylate resins, and combinations thereof.

The crosslinkers are preferably activated at temperatures above 50° C., in particular at temperatures from 100° C. to 160° C. and, with very particular preference, at temperatures from 110° C. to 140° C.

The thermal excitation of the crosslinkers can also be effected by means of IR rays or high-energy alternating fields.

Further embraced by the concept of the invention is a self-adhesive tape produced with the aid of the pressure-sensitive hot-melt adhesive composition by applying the self-adhesive composition to at least one side of a material in web form.

Depending on the intended use of the adhesive tape, suitable web-form carrier materials for the self-adhesive compositions processed and produced in accordance with the invention are all known carriers, with or without appropriate chemical or physical surface pretreatment of the coating side, and anti-adhesive physical treatment or coating of the reverse side. Mention may be made, for example, of creped and non-creped papers, polyethylene, polypropylene and mono- or biaxially oriented polypropylene films, polyester, PVC and other films, foam materials in web form, made from polyethylene and polyurethane, for example, wovens, knits and nonwovens.

Finally, the web-form material can be a material with an antiadhesive coating on both sides, such as release papers or release films. The thickness of the self-adhesive composition on the web-form material can be between 10 $\mu$m and 2000 $\mu$m, preferably between 15 $\mu$m and 150 $\mu$m.

Finally, the self-adhesive composition can be applied in a thickness of from 800 $\mu$m to 1200 $\mu$m on a release paper. An adhesive-composition layer of this kind, especially after crosslinking, can be used diversely as a backingless double-sided self-adhesive tape.

Owing to the high molecular weight of the unmasticated elastomers, the process of the invention provides for the first time the possibility of being able either to do away entirely with crosslinking the pressure-sensitive adhesive composition or else to carry out effective crosslinking which permits, for example, high-temperature applications of the adhesive tapes produced by this process, by means of high-energy radiation, without the need for promoters for this purpose. Furthermore, as a result of the temperature regime at a lower level, it is now also possible for the first time to use heat-activatable crosslinkers in the production of solvent-free self-adhesive compositions on the basis of non-thermoplastic elastomers, such as rubbers having a molecular weight $M_w \geq 1$ million.

The self-adhesive compositions produced in accordance with the process of the invention are highly shear-resistant. The rubbers used are not subjected to mastication, but in the individual process steps degradation processes occur which do not, however, durably impair the properties of the self-adhesive composition. Furthermore, these processes are restricted and are manageable as a result of the process of the invention.

The invention is described in more detail below with reference to the following examples, without wishing thereby to restrict the invention.

The test methods used are briefly characterized as follows:

The bond strength (peel strength) of the compositions was determined in accordance with AFERA 4001.

The shear strength of the adhesive compositions investigated was determined in accordance with PSTC 7 (holding power). All values given were determined at room temperature under the stated loads of 10 or 20 N, with a bond area of 20×13 mm². The results are reported in minutes of holding time.

Figure 1:
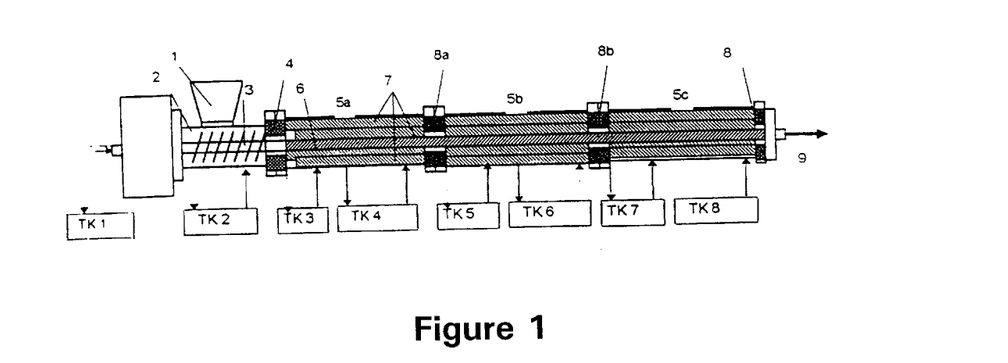
FIG. 1 illustrates one of the planetary roll extruder configurations used in the Examples

In the examples, a planetary roll extruder from the company ENTEX Rust & Mitschke was used. The diameter of a roll cylinder was 70 mm, its length being varied between 400 mm and 1200 mm. FIG. 1 shows one of the planetary roll extruder configurations used in the examples below.

The planetary roll extruder has a filling section (2) and a compounding section (5) consisting of three roll cylinders (5a–5c) in series. Within one roll cylinder, the planetary spindles (7) driven by the rotation of the central spindle (6) exchange the materials between central spindle (6) and planetary spindles (7) and between planetary spindles (7) and the wall of the roll cylinder (5a–5c). The rotary speed of the central spindle (6) was steplessly adjustable to up to 110 revolutions per minute.

At the end of each roll cylinder (5a–5c) there is an approach ring (8) which holds the planetary spindles (7) in fixed location.

By way of the filling port (1), all solid components of the solvent-free self-adhesive composition, such as elastomers, resins, fillers, antioxidants, etc., were metered on to the conveying screw (3) of the filling section (2) of the planetary roll extruder. The conveying screw (3) transfers the materials, subsequently, to the central spindle (6) of the first roll cylinder (5a). In order to improve the intake of material between central spindle (6) and planetary spindles (7), six planetary spindles (7) of different lengths in alternation were used in the first roll cylinder (5a).

The internally hollow conveying screw (3) and central spindle (6) are non-positively connected to one another and possess a common temperature control circuit. Each roll cylinder (5a–5c) of the compounding section (5) possessed two separate temperature control circuits. The filling section (2) was cooled by way of a further temperature control circuit. The temperature control medium used was pressurized water, cooling taking place with cooling water at from 15° C. to 18° C.

The separate metered addition of liquids such as plasticizer oil and/or crosslinker was made by way of the injection ring (4) in front of the first roll cylinder (5a) and/or by way of the approach rings (8a, 8b), which are provided with bores, or by a combination of both possibilities.

The temperature of the self-adhesive composition was determined by means of probes at the product discharge point (9).

The intention below is to illustrate the process of the invention by means of further figures without wishing thereby to restrict the invention unnecessarily.

Shown in

Figure 2:
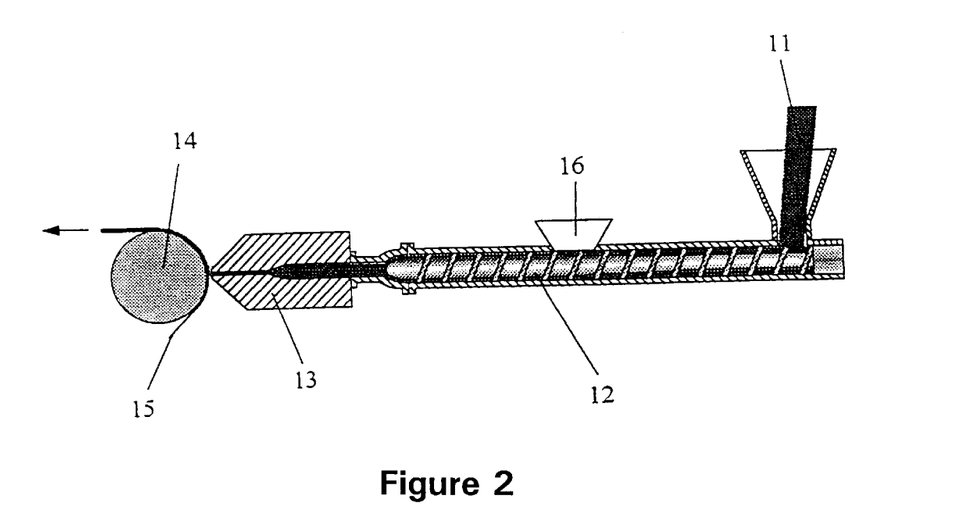
FIG. 2 illustrates the route of the self-adhesive composition from the upstream apparatus to the point of coating on to a carrier material.
Figure 3:
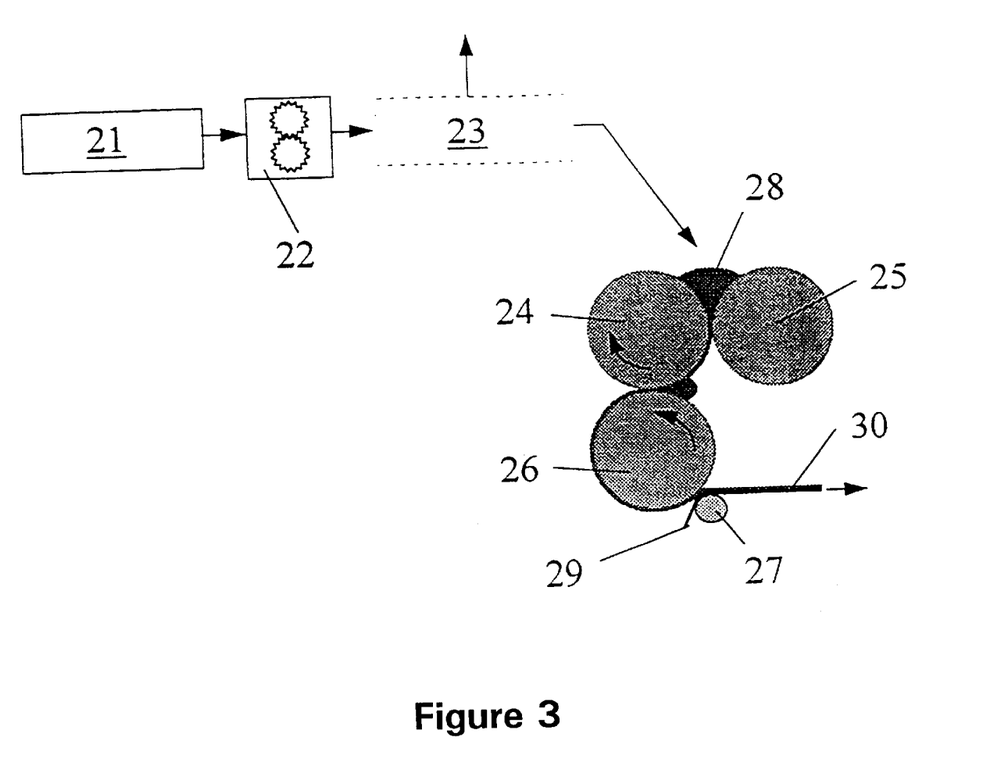
FIG. 3 illustrates an advantageous embodiment of the entire process of the invention.

FIG. 2 is the route taken by the self-adhesive composition from the upstream apparatus, preferably a planetary roll extruder, to the point of coating on to a carrier material, and in FIG. 3 is an overview of the entire process in a particularly advantageous embodiment.

In accordance with FIG. 2, the strand (11) of the self-adhesive composition comes from the upstream apparatus, preferably a planetary roll extruder, into a conveying extruder (12). In this extruder (12) the self-adhesive composition is freed from air via an aperture (16) with the aid of vacuum and is conveyed into a coating nozzle having a coathanger manifold (13), with which the self-adhesive composition is applied to the carrier material (15), which runs over a cooling roll (14).

FIG. 3, finally, gives an overview of the entire process in a particularly advantageous embodiment. In the first process step, the self-adhesive composition (28) is compounded in a planetary roll extruder (21). The finished self-adhesive composition (28) is conveyed into a melt pump (22) which transfers the self-adhesive composition (28) into a roll applicator unit.

After compounding under an inert gas atmosphere, there is a devolatilizing extruder (23) between melt pump (22) and roll applicator unit for the purpose of obtaining an air-bubble-free self-adhesive composition (28). The roll applicator unit is formed by a metering roll (24), a coating-bar roll (25), which determines the thickness of the self-adhesive layer (28) on the carrier material (29), and a transfer roll (26). On a layup roll (27), finally, the self-adhesive composition (28) and the carrier material (29) are brought together and so form a laminate (30).

EXAMPLES

Comparative Examples 1 to 3

The efficiency of a planetary roll extruder in terms of the achieveable throughput when using a plurality of roll cylinders in series for the process of the invention for the solvent-free production of self-adhesive compositions based on non-thermoplastic elastomers is shown by Comparative Examples 1 to 3. The planetary roll extruder used was as described in principle in FIG. 1. With the same formulation and under otherwise constant conditions, the planetary roll extruder was operated in each case with one, two or three roll cylinders, each roll cylinder being equipped with 6 planetary spindles and an approach ring having a free cross section of 44 mm being used between each roll cylinder. The rotary speed of the central spindle was set at 100 revolutions/minute. For each planetary roll extruder configuration, the maximum product rate ($Q_{max}$) up to which a homogeneous compound was obtained was determined.

In Examples 1 to 3, formulation A was used. In these and all subsequent examples, the non-thermoplastic elastomers were used in the form of granules having average particle sizes of 8 mm. In order to keep the granules meterable, they were treated with talc. The granules were produced using a cutting mill from Pallmann.

| | Exemplary formulation A | |
|---|---|---|
| A | Component | Weight fraction [phr] |
| | NR Air Dried Sheets | 100 |
| | Zinc oxide, active | 11.4 |
| | Escorez 1202 ® | 43.6 |
| | Dercolyte S115 ® | 20 |
| | Resin 731 D ® | 50.9 |
| | Ondina G 33 ® | 8 |
| | Lowinox AH 25 ® | 2.5 |
| | Total | 236.4 |

All of the components of the formulation were used to produce, in a 50 kg powder mixer, a premix which was metered via a volumetric metering system into the filling section of the planetary roll extruder. The temperature control circuits for the central spindle and the filling section (TK1 and TK2) were water-cooled, and each roll section was heated at 100° C. The table shows the maximum product rates obtained as a function of the number of roll cylinders.

| Comparative Example | Number of roll cylinders | $Q_{max}$ [kg/h] |
|---|---|---|
| 1 | 1 | 45 |
| 2 | 2 | 62 |
| 3 | 3 | 83 |

Example 4

For the production of masking tapes based on paper backings, the formulation used was formulation A from Examples 1–3. The composition was produced in a planetary roll extruder in analogy to Example 3. The discharge temperature of the composition was 112° C.

The adhesive composition obtained in this way, immediately after the production process, was applied with a layer thickness of 40 µm to a slightly creped paper backing having a basis weight of 68 g/m² which had been impregnated by industry-standard processes and provided with a known release layer and primer layer. The adhesive composition was coated with the aid of a 4-roll calender applicator unit from Farrel in an operating width of 1200 mm with supply of the composition through a single-screw conveying extruder. Coating took place in synchronism, i.e. the adhesive was transferred to the creped paper by the third calender roll, which determined the amount of adhesive applied, with the aid of a web-guiding contact roll (rubber).

The adhesive emerging from a conveying extruder was conveyed at changed speed into the upper roll nip of the calender with the aid of a conveyor belt. By virtue of the nip established between the two upper rolls of the calender, a pre-metering of composition is achieved which produces an adhesive film approximately 2 to 3 cm thick. This preformed film of composition is taken off by the third roll and shaped to the desired application of composition by means of the nip established with respect to the third roll. The third roll undertakes transfer to the substrate, which is guided via a contact roll, at web speed in synchronism.

Between the rolls, a differential speed was established in a ratio of 6:1. All rolls were temperature controlled to 113° C. The coating speed was 150 m/min.

The adhesive tape obtained in this way has a bond strength of 3.5 N/cm, shear hold times (10N) of >1000 minutes, and is suitable as a masking tape with short-term thermal stability of up to 80° C.

After coating, the adhesive composition applied to the adhesive tape thus obtained was crosslinked by means of electron beams. Irradiation was carried out on a scanning accelerator from POLYMER PHYSIK, Tübingen, with an acceleration voltage of 175 kV and a radiation dose of 20 kGy.

With unchanged bond strength, the shear hold times (10N) measured in the same way increased to >5000 minutes and the resulting tape was suitable as a masking tape with short-term temperature stability of up to 120° C.

Example 5

A high-temperature masking tape based on a paper backing was produced using the following exemplary formulation B.

| | Exemplary formulation B | |
|---|---|---|
| B | Component | Weight fraction [phr] |
| | NR Air Dried Sheets | 100 |
| | Zinc oxide, active | 11.4 |
| | Stearic acid | 1.1 |
| | Escorez 1202 ® | 20 |
| | Dercolyte S115 ® | 43.6 |
| | Resin 731 D ® | 50.9 |
| | Ondina G 33 ® | 8 |
| | Lowinox AH 25 ® | 2.5 |

-continued

Exemplary formulation B

| B | Component | Weight fraction [phr] |
|---|---|---|
| | Rhenogran S 80 ® | 3.1 |
| | Rhenogran ZEPC 80 ® | 4.4 |
| | Rhenocure HX ® | 0.5 |
| | Total | 245.5 |

The composition was produced in a planetary roll extruder as in FIG. 1 having three roll cylinders. The first roll cylinder was equipped with six planetary spindles, the second and third roll cylinders each with seven. The rotary speed chosen for the central spindle was 110 rpm.

The temperature control circuits 1 to 3 and 7 to 8 were operated with cooling water at 18° C.; temperature control circuits 4 to 6 were heated at 95° C. The discharge temperature of the composition was found to be 99° C.

All of the components were premixed and this premix was metered continuously at a rate of 66 kg/h into the filling section of the planetary roll extruder.

Immediately after the production process, the adhesive composition obtained in this way was applied with a layer thickness of 55 µm to a moderately creped paper backing having a basis weight of 85 g/m² which had been impregnated by industry-standard processes and provided with known release and primer layers.

The adhesive composition was coated as in Example 4 in a working width of 500 mm. All rolls were temperature controlled to 113° C. The coating speed was 60 m/min.

After coating, the adhesive composition applied to the adhesive tape obtained in this way was crosslinked by means of electron beams as in Example 4. The radiation dose was 25 kGy.

The adhesive tape obtained in this way had a bond strength of 4.5–5 N/cm, shear hold times (10N) of more than 10,000 minutes, and was suitable as masking tape having short-term temperature stability of up to 140° C.

Example 6

The adhesive of the adhesive tape produced in accordance with Example 5 was crosslinked not with electron beams but instead chemically under the action of temperature.

Crosslinking took place in a vulcanization tunnel with an effective residence time of 4 min/120° C.

The temperature stability of the tape obtained in this way increased to 160° C.

Example 7

Packaging tape prototypes based on film were produced using the following exemplary formulation C.

Exemplary formulation C

| C | Component | Weight fraction [phr] |
|---|---|---|
| | SMR L | 100 |
| | Dercolyte S 115 ® | 104 |
| | ASM Lowinox AH 25 ® | 2 |
| | Total | 206 |

The abovementioned components were supplied continuously but separately via volumetric metering systems to the filling section of the planetary roll extruder. The process parameters were otherwise as in Example 4. The product discharge temperature was measured as 122° C.

Immediately after the production process, the adhesive composition obtained in this way was applied with a layer thickness of 20 µm to an industry-standard 30 µm BOPP film provided with an industry-standard primer layer based on isocyanate and with an industry-standard release layer based on carbamate.

The adhesive composition emerging from a conveying extruder was coated with the aid of a flexurally rigid 2-roll applicator unit. The adhesive film was coated directly onto the primed film side. A coating nib corresponding to the applied thickness was established between the first and the second, web-guiding coating roll. The first roll was temperature contolled to 100° C., the web-guiding roll to 90° C. The adhesive composition emerging from the conveying extruder had a temperature of 120° C. Coating was carried out at 50 m/min.

The adhesive tapes obtained in this way had a bond strength of 3–4 N/cm and shear hold times (20N) of >10,000 minutes, and are suitable as adhesive tapes for packaging purposes.

Example 8

Double-sided adhesive tapes based on film backings were produced using the following exemplary formulation D.

Exemplary formulation D

| D | Component | Weight fraction [phr] |
|---|---|---|
| | Rubber ADS | 100 |
| | Dercolyte S 115 ® | 104 |
| | Sunpar Oil 2280 ® | 2 |
| | ASM Lowinox AH 25 ® | 2 |
| | Total | 208 |

The composition was produced as in Example 7. In addition, the liquid plasticizer was metered continuously via the injection ring upstream of the first roll cylinder with the aid of a membrane piston pump. The product discharge temperature was measured as 105° C. The product rate was 68 kg/h.

Immediately after the production process, the adhesive composition obtained in this way was applied with a layer thickness of 2×40 µm to both sides of a commercial 38 µm E-PVC film.

Coating took place with the aid of the applicator unit from Example 5. The adhesive composition was applied to the E-PVC film indirectly in reverse mode. Coating was carried out at a speed of 50 m/min. The transfer roll was operated at 85% of the web speed. Roll 1 and roll 2 were temperature controlled at 100° C. and 80° C. respectively. The web-guiding roll was temperature controlled to 30° C. Directly after coating, the adhesive side was lined with a double-sided silicone paper. The assembly was then coated by the same process as the first side, and rolled up.

The adhesive tapes obtained in this way have a bond strength of 7.5 N/cm and shear hold times (10N) of >5000 minutes; they are suitable as double-sided adhesive tapes for a wide variety of uses, such as for the adhesive bonding of plates in the printing industry.

Example 9

A double-sided carpet-laying tape based on woven backing was produced using the following exemplary formulation E.

| Exemplary formulation E | | |
|---|---|---|
| E | Component | Weight fraction [phr] |
| | SMR L | 100 |
| | Escorez 1202 ® | 55 |
| | Dercolyte S 135 ® | 55 |
| | Wingtack 10 ® | 15 |
| | Zinc oxide Harzsiegel ® | 22 |
| | ASM Lowinox AH 25 ® | 2 |
| | Total | 247 |

The composition was produced using a planetary roll extruder configuration as mentioned in Example 5 with a central spindle rotary speed of 95 rpm. For the purpose of metering liquids, the approach rings after the first and second roll cylinder were provided with radial bores. The free cross sections in the approach rings in this example were 46 and 44 mm respectively.

Via the temperature control circuits 4 to 6, the roll cylinders were heated at 105° C.; temperature control circuits 1 to 3 and 7 to 8 were cooled with water at a temperature of 15° C.

Except for the Escorez and Dercolyte resins, the components of the formulation were metered via separate volumetric metering systems. The two resins were formed beforehand in a powder mixer into a premix which was then metered in. The viscous soft resin Wingtack 10 was preheated to 60° C. for easier meterability and was metered in in the injection ring upstream of the first roll cylinder by way of a pipeline accompanied by electrical heating. The metering pump used was a double-action piston metering pump whose reservoir container had a heated and heat-insulated jacket which was temperature controlled to 60° C. The product discharge temperature was measured as 109° C. The product rate was 65 kg/h.

Immediately after the production process, the adhesive composition obtained in this way was applied with a layer thickness of 2×120 μm to both sides of a commercial woven spun rayon (yarn density 19/17).

A double-sided carpet-laying tape based on woven backing was produced with the aid of transfer coating. A release paper siliconized on both sides was coated directly with 120 μm by the process from Example 4. By way of a laminating station, the commercial raw spun rayon fabric was laminated on and in a second operation the assembly was coated likewise directly with 120 μm of adhesive on the exposed side. The temperature of the adhesive composition was 103° C. The coating rolls were temperature controlled to 90° C. The raw spun rayon fabric was supplied by way of a heated laminating station, the first laminating roll having a siliconized surface coating and the second, web-guiding laminating roll being temperature controlled to 80° C. Coating took place at a speed of 30 m/min.

The adhesive tapes obtained in this way have a bond strength of >7 N/cm and shear hold times (10N) of more than 200 minutes; they are suitable as double-sided adhesive tapes for a wide variety of purposes, especially for carpet-laying work.

Example 10

General-purpose adhesive tapes with different woven backings were produced using the following exemplary formulation F.

| Exemplary formulation F | | |
|---|---|---|
| F | Component | Weight fraction [phr] |
| | SMR L | 70 |
| | Cariflex IR 305 ® | 30 |
| | Escorez 1202 ® | 55 |
| | Picco 5120 ® | 55 |
| | Wingtack 10 ® | 50 |
| | Sunpar Oil 2280 ® | 15 |
| | ZnO Harzsiegel ® | 50 |
| | ASM Butyl Zimate ® | 2 |
| | Total | 325 |

This self-adhesive composition was produced using the same experimental setup as in Example 9.

Premixes were prepared respectively from the two solid resins, from the two pulverulent components and from the two elastomers, and these premixes were added to the filling section of the planetary roll extruder, separately, by way of volumetric metering devices. The plasticizer oil was added with the aid of a membrane piston pump via the injection ring upstream of the first roll cylinder; the soft resin, preheated to 60° C., was added via the approach ring downstream of the first roll cylinder by means of a double-action piston metering pump. All components were metered so as to give a product rate of 62 kg/h. The product discharge temperature was measured at 105° C.

The adhesive composition obtained in this way was applied with a layer thickness of 120 μm to a polyester/cotton blend fabric with a yarn density of 22/10, with an 80 μm polyethylene layer laminated on, which is provided on its reverse side with an industry-standard carbamate release varnish.

General-purpose woven-backed tapes were produced by the process of Example 4. In this case, instead of the paper backing web, the polyester/cotton blend fabric and the polyethylene film were guided over the contact roll and the 120 μm thick adhesive layer, shaped by the roll coating calender, was coated onto the polyester/cotton blend fabric. Coating took place at 155 m/min in a working width of 1200 mm. The coating rolls were operated in a ratio of 6:1. The tape produced in this way has a bond strength of >5 N/cm

Example 11

An adhesive composition was produced in accordance with exemplary formulation G.

Exemplary formulation G

| G | Component | Weight fraction [phr] |
|---|---|---|
| | SMR L | 100 |
| | Stearic acid | 1.1 |
| | Escorez 1202 ® | 55 |
| | Dercolyte S 135 ® | 55 |
| | Wingtack 10 ® | 15 |
| | Zinkoxyd aktiv ® | 22 |
| | ASM Lowinox AH 25 ® | 2 |
| | Rhenogran S 80 ® | 4.4 |
| | Rhenogran ZEPC 80 ® | 4.4 |
| | Rhenocure HX ® | 0.6 |
| | Total | 259.5 |

The adhesive composition was produced in a planetary roll extruder in accordance with FIG. 1 having three roll cylinders and equipped with planetary spindles as in Example 5. The rotary speed of the central spindle was set at 100 rpm.

To produce the self-adhesive composition containing thermal crosslinkers, the temperature control circuits 1 to 3 and 7 to 8 were operated with cooling water at 16° C. while the temperature control circuits 4 to 5 were heated at 110° C. and the temperature control circuit 6 at 95° C. With this temperature regime, a composition discharge temperature of 98° C was obtained.

All of the solid components were combined to form a meterable premix which was metered continuously into the filling section of the planetary roll extruder. The liquid resin Wingtack 10 was added in preheated form as in Example 9 by means of a piston metering pump. In order to keep the residence time of the thermal crosslinker Rhenocure HX at elevated temperatures as short as possible, it was metered in via the second approach ring, i.e. upstream of the third roll cylinder, continuously by means of a peristaltic pump. In this example, operation took place with a product rate of 75 kg/h.

Directly after the production process, the adhesive composition obtained in this way was applied with a layer thickness of 1000 μm to a customary release paper with release coating on both sides.

The release paper siliconized on both sides was coated directly with 1000 μm by the process from Example 7. Coating took place at a speed of 30 m/min.

Subsequently, crosslinking was carried out in a vulcanizing tunnel with an effective residence time of 4 min/80° C.

The coated release paper obtained in this way constitutes a double-sided adhesive tape which can be put to diverse uses. It can be utilized, for example, as an assembly aid, for the self-adhesive treatment of parts to be joined or profiles, and for the transfer of the adhesive film to other carriers. and is suitable as a general-purpose adhesive tape for a very wide variety of purposes.

Example 12

A double-sided carpet-laying tape based on woven backing was produced with the exemplary formulation H.

Exemplary formulation H

| H | Component | Weight fraction [phr] |
|---|---|---|
| | Rubber ADS | 100.0 |
| | Hercurez C | 54.9 |
| | Escorez 1202 | 41.4 |
| | Plasticizer Nipol | 17.5 |
| | Zinkoxyd aktiv | 7.5 |
| | Silitin Z 86 | 24.7 |
| | Stearic acid | 1.0 |
| | ASM Lowinox AH 25 | 2.5 |
| | Total | 249.5 |

The self-adhesive composition was produced in a planetary roll extruder as per FIG. 1 having three roll cylinders and equipped with planetary spindles as mentioned in Example 5. The planetary roll extruder was operated with a central spindle rotary speed of 110 rpm.

The temperature control circuits 1 to 3 and also temperature control circuit 8 were operated with cooling water at 16° C. The temperature control circuits 4 to 5 were heated at 120° C. and the temperature control circuits 6 to 7 at 100° C. This gave a temperature of the composition at the outlet from the planetary roll extruder of 112° C.

In analogy to Example 11, all solid components were combined to form a meterable premix which was metered into the filling port of the planetary roll extruder. The viscous plasticizer Nipol was preheated to 75° C. for easier meterability and was added via the approach ring upstream of the second roll cylinder with the aid of the double-action piston metering pump from Example 9. The product rate established was 81 kg/h.

With the aid of transfer coating, the adhesive composition was applied with a layer thickness of 2×55 g/m² to both sides of a commercial polyethylene-based foam material having a thickness of 1000 μm and a density of 95 kg/m³.

A double-sided carpet-laying tape based on woven backing was produced. A release paper siliconized on both sides was coated directly with 55 μm by the process from Example 8. In a laminating station, the PE foam is laminated on and in a second operation the assembly is coated likewise directly with 55 μm of adhesive onto the exposed side. The temperature of the adhesive composition was 100° C. The coating rolls were temperature controlled to 90° C. The PE foam material was supplied by way of a heated laminating station, the first laminating roller having a siliconized surface coating and the second, web-guiding laminating roll being temperature controlled to 80° C. Coating took place at a speed of 30 m/min.

The adhesive tapes obtained in this way have a bond strength of >3.5 N/cm and shear hold times (10N) of >250 minutes; they are suitable as double-sided adhesive tapes having tolerance-compensating and damping properties for a wide variety of purposes.

What is claimed is:

1. A process for the continuous solvent-free and mastication-free production of self-adhesive compositions comprising rubber having a molecular weight $M_w \geq 1$ million in a continuously operating planetary roll extruder having a filling section and a compounding section, comprising a) feeding solid components of the self-adhesive composition, including rubber having a molecular weight $M_w \geq 1$ million, into the filling section of the planetary roll extruder, optionally with fillers, colorants, crosslinkers, or a combination thereof, b) transferring the solid components of the self-adhesive composition from the filling section to the compounding section, c) adding liquid components of the self-adhesive composition to the compounding section, d) preparing a homogeneous self-adhesive composition in the compounding section, and e) discharging the self-adhesive composition.

2. Process according to claim 1, wherein said compounding section of said planetary roll extruder has at least two coupled roll cylinders.

3. Process according to claim 2, wherein each roll cylinder of the planetary roll extruder contains at least half the maximum number of planetary spindles that each is capable of accommodating.

4. Process according to claim 1, wherein, following its discharge from the apparatus the self-adhesive composition is freed from gas bubbles under the effect of reduced pressure.

5. Process according to claim 1, wherein said discharged self-adhesive composition is conveyed into a coating device and further comprising the step of coating the self-adhesive composition with the coating device onto a material in web form.

6. Process according to claim 5, wherein said discharged self-adhesive composition is conveyed to said coating device by a melt pump or a conveying extruder for conveying the adhesive composition, which is operated with rotational speed regulation or pressure regulation, and is arranged between the planetary roll extruder and the coating device.

7. Process according to claim 5, wherein the coating of the web-form material takes place with a roll mill or calender unit, the self-adhesive composition being shaped to the desired thickness as it passes through one or more roll nips prior to transfer to the web-form material.

8. Process according to claim 5, wherein the coating of the web-form material takes place with an extrusion die fed by an extruder.

9. Process according to claim 8, wherein the extrusion die is configured as a coathanger manifold die.

10. Process according to claim 5, wherein the coated material is crosslinked in a step subsequent to the step of coating.

11. Process according to claim 10, wherein the coated material is crosslinked by means of electron beams without promoters.

12. Process according to claim 10, wherein the coated material is thermally crosslinked.

13. Process according to claim 1, wherein at the exit from the apparatus the self-adhesive composition has a temperature of less than 150° C.

14. Process according to claim 1, wherein said self-adhesive compositions comprise components selected from the group consisting of natural rubbers, randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene vinyl acetate copolymers (EVA), polyolefins, polyurethanes and blends thereof.

15. Process according to claim 1, wherein said compositions comprise thermoplastic and non-thermoplastic elastomers, the thermoplastic elastomers comprising from 10 to 50% by total weight of elastomers.

16. Process according to claim 1, wherein the crosslinkers are selected from the group consisting of sulphur systems, accelerated sulphur systems, reactive phenolic resin systems and diisocyanate crosslinking systems.

17. Process according to claim 1, wherein the crosslinkers are heat-activatable.

18. Process according to claim 2, wherein said planetary roll extruder has three coupled roll cylinders.

19. Process according to claim 3, wherein each roll cylinder contains more than ¾ the maximum number of planetary spindles that each is capable of accommodating.

20. Process of claim 6, wherein said conveying extruder is a devolatilizing extruder which is operated with pressure regulation.

21. Process of claim 13, wherein said temperature is between 70° C. and 110° C.

22. Process of claim 17, wherein said crosslinkers are heat-activatable at temperatures of from 110–140° C.

* * * * *